US012470866B2

(12) United States Patent
Tong et al.

(10) Patent No.: US 12,470,866 B2
(45) Date of Patent: Nov. 11, 2025

(54) DOUBLE-SIDED SPEAKER DEVICE

(71) Applicant: ShenZhen Luxshare Acoustics Technology Ltd., Shenzhen (CN)

(72) Inventors: ZhiHua Tong, Shenzhen (CN); ZhiHe Zeng, Shenzhen (CN)

(73) Assignee: ShenZhen Luxshare Acoustics Technology Ltd., Shenzhen (CN)

( * ) Notice: Subject to any disclaimer, the term of this patent is extended or adjusted under 35 U.S.C. 154(b) by 83 days.

(21) Appl. No.: 18/518,710

(22) Filed: Nov. 24, 2023

(65) Prior Publication Data

US 2024/0179460 A1 May 30, 2024

(30) Foreign Application Priority Data

Nov. 25, 2022 (CN) ......................... 202211491240.7

(51) Int. Cl.
*H04R 3/00* (2006.01)

(52) U.S. Cl.
CPC ...................................... *H04R 3/00* (2013.01)

(58) Field of Classification Search
CPC .......... H04R 3/00; H04R 11/02; H04R 9/025; H04R 9/063; H04R 2209/027; H04R 2400/07
See application file for complete search history.

(56) References Cited

U.S. PATENT DOCUMENTS

D881,160 S 4/2020 Huang
11,985,460 B1 5/2024 Lu
2005/0276434 A1* 12/2005 Kobayashi ............... H04R 9/06 381/396
2007/0291976 A1* 12/2007 Kajiwara ............... H04R 11/02 381/396
2022/0322013 A1 10/2022 Lv et al.
2023/0217181 A1 7/2023 Yang et al.
2023/0224641 A1 7/2023 Tong et al.
2023/0232156 A1 7/2023 Tong et al.
(Continued)

FOREIGN PATENT DOCUMENTS

CN 201967122 U 9/2011
CN 103297904 B 9/2015
(Continued)

*Primary Examiner* — Matthew A Eason
(74) *Attorney, Agent, or Firm* — Birch, Stewart, Kolasch & Birch, LLP

(57) ABSTRACT

A double-sided speaker device comprises that of: a magnetic element, having a magnetic carrier with two lateral walls and a bottom plate and a magnetic circuit module, the two lateral walls being at two sides of the bottom plate, the magnetic circuit module being on the bottom plate; an outer frame, disposed at a peripheral side of the magnetic element; a first diaphragm, disposed beneath the outer frame, an inner surface of the first diaphragm being adhered to a bottom surface of the bottom plate of the magnetic carrier; a second diaphragm, disposed on the outer frame and located above the magnetic element; two voice coils, disposed underneath the second diaphragm, wrapped around the magnetic element, and located between the magnetic circuit module and the two lateral walls; and two elastic elements, connected with the magnetic carrier and the outer frame, and disposed at two sides of the magnetic carrier.

16 Claims, 11 Drawing Sheets

(56) References Cited

U.S. PATENT DOCUMENTS

| | | | |
|---|---|---|---|
| 2024/0022863 | A1 | 1/2024 | Tong et al. |
| 2024/0179460 | A1 | 5/2024 | Tong et al. |

FOREIGN PATENT DOCUMENTS

| | | | | |
|---|---|---|---|---|
| CN | 107517430 | A | | 12/2017 |
| CN | 109951773 | A | * | 6/2019 |
| CN | 111405438 | A | | 7/2020 |
| CN | 211959552 | U | | 11/2020 |
| CN | 113453128 | A | | 9/2021 |
| CN | 114745643 | A | | 7/2022 |
| EM | 009061658-0001 | | | 7/2022 |
| JP | D151243 | S | | 1/2015 |
| KR | 30-0461796 | S | | 9/2007 |
| KR | 30-1001549 | S | | 4/2019 |
| TW | D157384 | S | | 11/2013 |
| TW | M615661 | U | | 8/2021 |
| TW | I751069 | B | | 12/2021 |
| TW | M620751 | U | | 12/2021 |
| TW | I763515 | B | | 5/2022 |
| TW | M641589 | U | | 5/2023 |
| TW | M642069 | U | | 6/2023 |

* cited by examiner

DOUBLE-SIDED SPEAKER DEVICE

CROSS REFERENCE TO RELATED APPLICATION

This application claims the priority benefits of Chinese Patent Application Serial Number 202211491240.7, filed on Nov. 25, 2022, the full disclosure of which is incorporated herein by reference.

BACKGROUND

Technical Field

The present invention is in related to the technical field of a speaker device, more particularly to a double-sided speaker device.

Related Art

In the prior art, with the improvement of the quality of life and the popularization of smart mobile devices, people are constantly pursuing the sound quality of the playback sound quality of the speakers that can be carried around. Present speakers are mainly composed of magnets, coils and diaphragms and convert the vibrations of the current frequencies into sounds. Regarding how to further improve the performance of the speaker for playing music, one of the difficult problems to be solved is the problem of resonance and heat dissipation.

SUMMARY

The present invention discloses a double-sided speaker device, which objective is to solve the problem that of the poor effect of playing music since the resonance of the present speaker device affects the vibration of the whole case of the speaker device.

For solving aforesaid technical problems, the present invention will be described as following. The present invention discloses a double-sided speaker device, which comprises a magnetic element, an outer frame, a first diaphragm, a second diaphragm, two voice coils, and two elastic elements. The magnetic element have a magnetic carrier and a magnetic circuit module, wherein the magnetic carrier have two lateral walls and a bottom plate, the two lateral walls are disposed at two sides of the bottom plate, and the magnetic circuit module is disposed on the bottom plate. The outer frame is disposed at a peripheral side of the magnetic element. The first diaphragm is disposed beneath the outer frame, and an inner surface of the first diaphragm is adhered to a bottom surface of the bottom plate of the magnetic carrier. The second diaphragm is disposed on the outer frame and located above the magnetic element. The two voice coils are disposed underneath the second diaphragm, wrapped around the magnetic element, and located between the magnetic circuit module and the two lateral walls of the magnetic carrier. The two elastic elements are connected with the magnetic carrier and the outer frame, and disposed at two sides of the magnetic carrier correspondingly.

In one of the embodiments, the bottom plate and the two lateral walls of the magnetic carrier are integrally formed as a U-type structure.

In one of the embodiments, two heights of the two lateral walls are equal to or greater than an entire thickness of the magnetic circuit module.

In one of the embodiments, the two lateral walls of the magnetic carrier further have two lateral magnetic members and two lateral magnetic plates, the two lateral magnetic members are disposed at two sides of the bottom plate, and the two lateral magnetic plates are disposed at the two lateral magnetic members.

In one of the embodiments, two outer sides of the two lateral magnetic plates have two magnetic notches, two inner sides of the elastic element are fixed at the two magnetic notches, and two outer sides of the elastic element are fixed at the outer frame.

In one of the embodiments, the magnetic circuit module further has a magnetic member and a magnetic plate, the magnetic member is disposed at the bottom plate, and the magnetic plate is disposed on the magnetic member.

In one of the embodiments, the outer frame further has two first frames and two second frames, and two outer sides of the elastic element are fixed between the first frame and the second frame.

In one of the embodiments, each of the first frame has a first frame portion and two first fixed portions, wherein the two first fixed portions are located at two ends of the first frame portion, each of the second frame has a second frame portion and two second fixed portions, the two second fixed portions are located at two ends of the second frame portion, the second frame is assembled on the first frame, the second frame portion is correspondingly assembled with the first frame portion, an outer side of the elastic element is fixed in between the first frame portion and the second frame portion, and the two second fixed portions are correspondingly assembled with the first fixed portion.

In one of the embodiments, the first frame portion is protruded between the two first fixed portions, wherein the second frame portion is recessed between the two second fixed portions, the first frame portion is embedded in the second frame portion, and the two second fixed portions are assembled with the two first fixed portions.

In one of the embodiments, four heights of the two first fixed portions and the two second fixed portions are the same.

In one of the embodiments, the two first fixed portions have a plurality of fixed holes, and the two second fixed portions have a plurality of fixed columns, the plurality of fixed columns of the two second fixed portion are embedded in the plurality of fixed holes of the two first fixed portions.

In one of the embodiments, the outer frame further has a plurality of first air holes and second air holes, wherein the first air holes are disposed on a side surface of the first frame portion of the first frame, the second air holes are disposed between the two first fixed portions of the first frame and the two second fixed portions of the second frame, the second air holes are composed of the two first fixed portions assembling with the two second fixed portions correspondingly.

In one of the embodiments, the first frame portion is recessed in the two first fixed portions, a height of the second frame portion is the same as two heights of the two first fixed portions, the second frame is disposed on the first frame, the second frame portion covers a recess structure of the first frame portion.

In one of the embodiments, each of the two first fixed portions has two side columns at two corners thereof, and each of the two second fixed portions has two side grooves at two corners corresponding to the two corners of the first fixed portion, wherein the side columns of the first fixed portion are embedded in the side grooves of the second fixed portion.

In one of the embodiments, the second frame is a steel structure.

In one of the embodiments, the outer frame further has a plurality of first air holes and second air holes, wherein the first air holes are disposed on a side surface of the first frame portion of the first frame, and the second air holes are disposed on two end surfaces of the two first fixed portions of the first frame.

The present invention provides a double-sided speaker device, the elastic elements of which are connected with the magnetic element and the outer frame. When the magnetic element performs electromagnetic induction to make the voice coil and the second diaphragm vibrate and produce sound, the magnetic element will vibrate under the same reaction force. At this time, the vibration force, and the vibration forces have been absorbed by the elastic element and the first diaphragm to greatly reduce the impact on the outer frame, thereby reducing the impact of the vibration of the outer frame to the entire body of the double-sided speaker device. Further, the vibration forces are also absorbed by the first diaphragm with a large surface area, so as to decrease the impact to the outer frame. Because the first diaphragm is passively connected and arranged under the outer frame, during operation, the first diaphragm can play a role of passive radiation and enhance the low-frequency effect during sound generation.

The accompanying drawings are incorporated in and constitute a part of this application and, together with the description, serve to explain the principles of the invention in general terms. Like numerals refer to like parts throughout the disclosure.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms “include/including” and “comprise/comprising” are used in an open-ended fashion, and thus should be interpreted as “including but not limited to”. “Substantial/substantially” means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms “include”, “contain”, and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by “include a/an . . . ” does not exclude other same elements existing in the process, the method, the article, or the device which includes the element.

Figure 1:
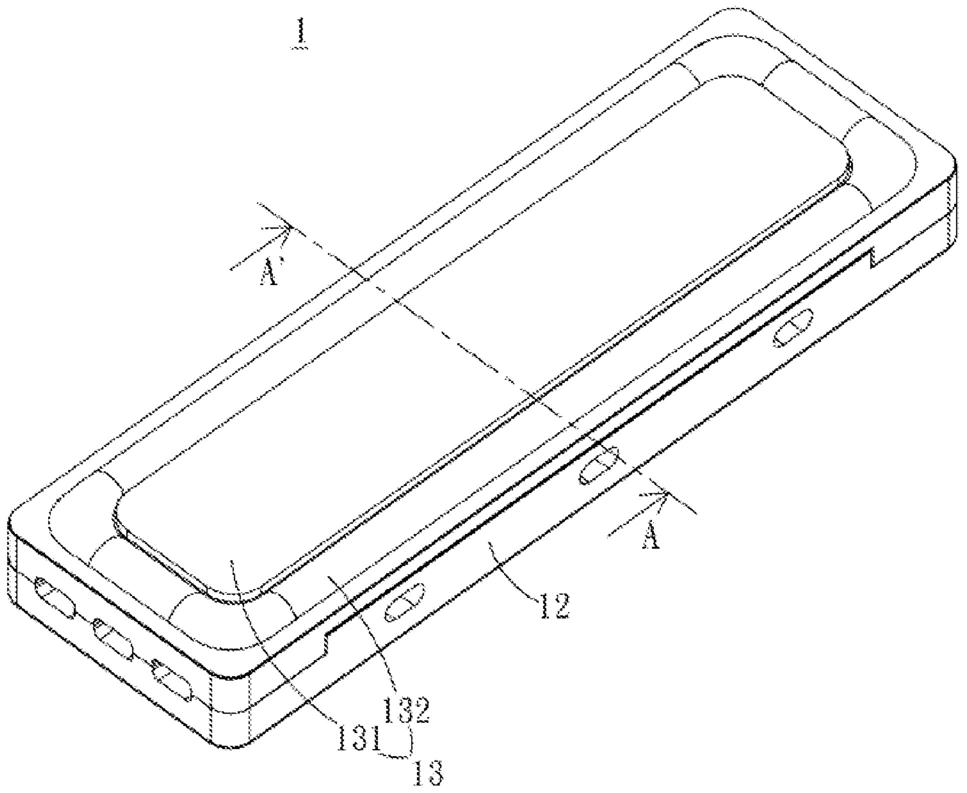
FIG. 1 illustrates a schematic 3-D view of a first embodiment of the double-sided speaker device of the present invention.
Figure 2:
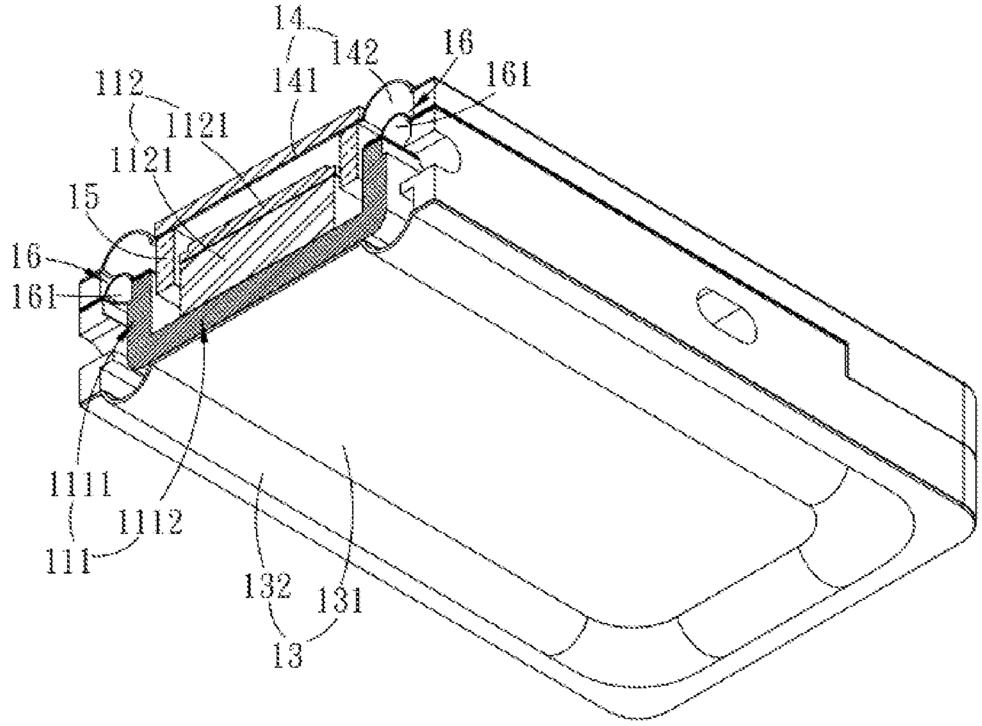
FIG. 2 illustrates a schematic exploded 3-D view of a cross section taken along a line A-A' of FIG. 1.

Please refer to FIG. 1 to FIG. 4, which illustrate a schematic 3-D view of a first embodiment of the double-sided speaker device of the present invention, a schematic exploded 3-D view of a cross section taken along a line A-A' of FIG. 1, a schematic view of a cross section taken along the line A-A' of FIG. 1, and a schematic exploded view of the first embodiment of the double-sided speaker device of the present invention. As shown in figures, the present invention provides a double-sided speaker device 1, which includes a magnetic element 11, an outer frame 12, a first diaphragm 13, a second diaphragm 14, two voice coil 15, and two elastic elements 16. The magnetic element 11 has a magnetic carrier 111 and a magnetic circuit module 112. The magnetic carrier 111 has two lateral walls 1111 and a bottom plate 1112. The two lateral walls 1111 are disposed at two sides of the bottom plate 1112. The magnetic circuit module 112 is disposed on the bottom plate 1112. The outer frame 12 is disposed at a peripheral side of the magnetic element 11, wherein a separation interval DI is between each of the two lateral walls 1111 and the outer frame 12. The first diaphragm 13 is disposed beneath the outer frame 12, and an inner surface of the first diaphragm 13 is adhered to a bottom surface of the bottom plate 1112 of the magnetic carrier 111. The second diaphragm 14 is disposed on the outer frame 12 and located above the magnetic element 11. The voice coil 15 is disposed underneath the second diaphragm 14, wrapped around the magnetic element 11, and located between the magnetic circuit module 112 and the two lateral walls 1111 of the magnetic carrier 111. The elastic element 16 is connected with the magnetic carrier 111 and the outer frame 12, and disposed at two sides of the magnetic carrier 111 correspondingly.

Figure 3:
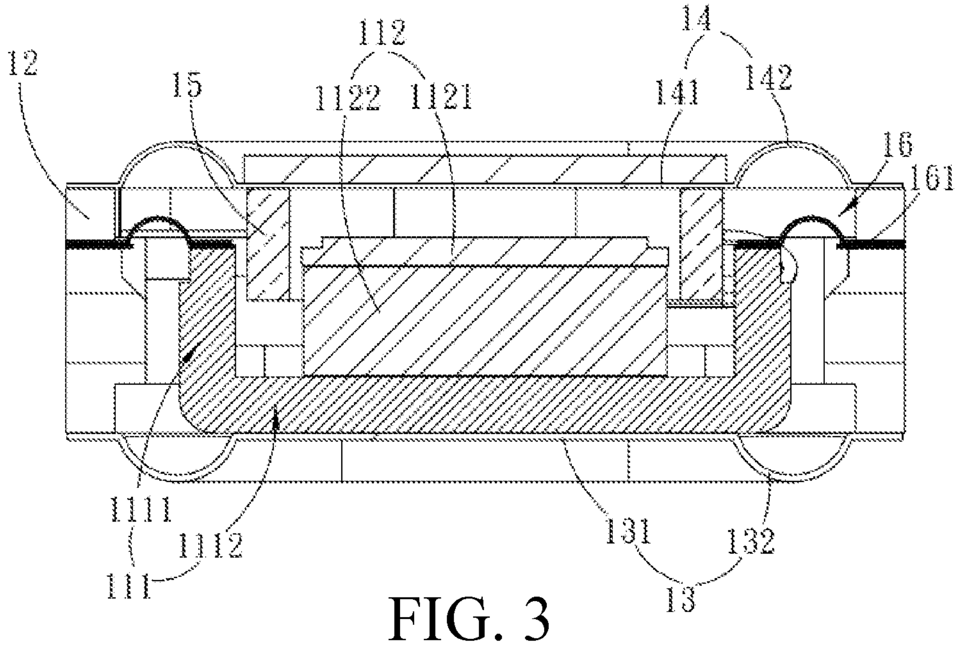
FIG. 3 illustrates a schematic view of a cross section taken along the line A-A' of FIG. 1.
Figure 4:
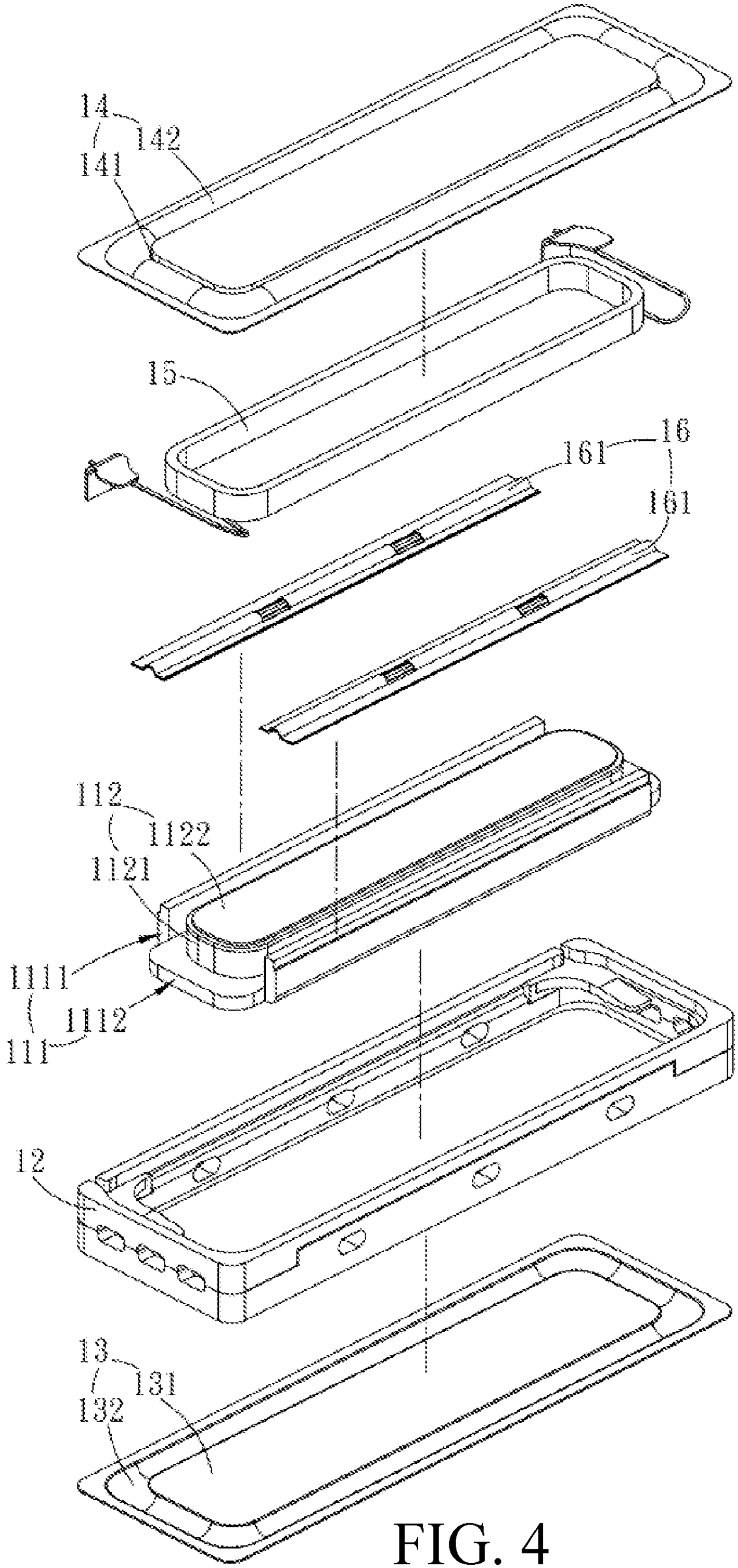
FIG. 4 illustrates a schematic exploded view of the first embodiment of the double-sided speaker device of the present invention.

Accordingly, the bottom plate 1112 and the two lateral walls 1111 of the magnetic carrier 111 are integrally formed as a U-type structure (Referring to FIG. 3). The magnetic circuit module 112 further has a magnetic member 1121 and a magnetic plate 1122. The magnetic member 1121 is disposed at the bottom plate 1112, and the magnetic plate 1122 is disposed on the magnetic member 1121. The first diaphragm 13 includes a first inner membrane 131 and two first rings 132. Each of the two first rings 132 is arranged on one side of the first inner membrane 131, and the other side of each of the two first rings 132 is connected with the outer frame 12. The first inner membrane 131 is attached to a bottom surface of the bottom plate 1112 of the magnetic carrier 111. The second diaphragm 14 includes a second inner membrane 141 and two second rings 142. Each of the two second rings 142 is arranged on one side of the second inner membrane 141, and the other side of each of the two second rings 142 is connected with the outer frame 12. The second inner membrane 141 is above the magnetic circuit module 112, and the two voice coils 15 are disposed at two outer sides of the magnetic circuit module 112 and below the second inner membrane 141. Each of the two elastic elements 16 has two elastic members 161, which are connected with the lateral wall 1111 of the magnetic carrier 111 and the outer frame 12. An inner side of one of the elastic member 161 is fixed on the lateral wall 1111, and an outer side of the other elastic member 161 is fixed on the outer frame 12. Obviously, the two elastic members 161 stable the connections between the magnetic carrier 111 and the outer frame 12.

The descriptions for the application of the double-sided speaker device 1 of the present invention are as following. During the electrified operation, the audio current passes through the voice coil 15, which is subjected to the magnetic field of the magnetic element 11, so that the voice coil 15 drives the second diaphragm 14 to vibrate and produce sound. Simultaneously, the magnetic element 11 will also be subjected to the reaction force of the voice coil 15. The force received by the magnetic element 11 and the voice coil 15 is equal in magnitude, but the direction of the force is opposite, so that the magnetic element 11 is opposite to the voice coil 15 in vibration. Further, the magnetic element 11 is connected with the elastic member 161 by suspension, the elastic member 161 also moves in the opposite direction due to external forces, in order to balance the vibrations from the voice coil 15. For the double-sided speaker device 1 in movement, via the first diaphragm 13 and the elastic element 16, the magnetic element 11 is kept within the outer frame 12. As it can be seen, the first diaphragm 13 and the elastic element 16 function to be as dampers, so as to balance the movements or vibrations of the magnetic element 11. On the other hand, the first diaphragm 13 can reduce other influences or interferences from environments.

The magnetic element 11 drives the first inner membrane 131 of the first diaphragm 13. That is to say, through the first diaphragm 13 and the outer frame 12 being connected with each other, the vibrations from the magnetic element 11 are transmitted to the outer frame 12 by the first diaphragm 13. Since the vibration forces have been absorbed by the first diaphragm 13 with a large vibrating surface, thereby greatly reducing the impact on the outer frame 12, so that the impact of the vibrations of the outer frame 12 on the double-sided speaker device 1 can be reduced as well. In addition, because the first diaphragm 13 reduces the vibration amplitude and frequency of the magnetic element 11, it does not produce a resonance effect on the outer frame 12, so as to achieve passive radiation and enhance the low-frequency effect of the double-sided speaker device 1.

Figure 5:
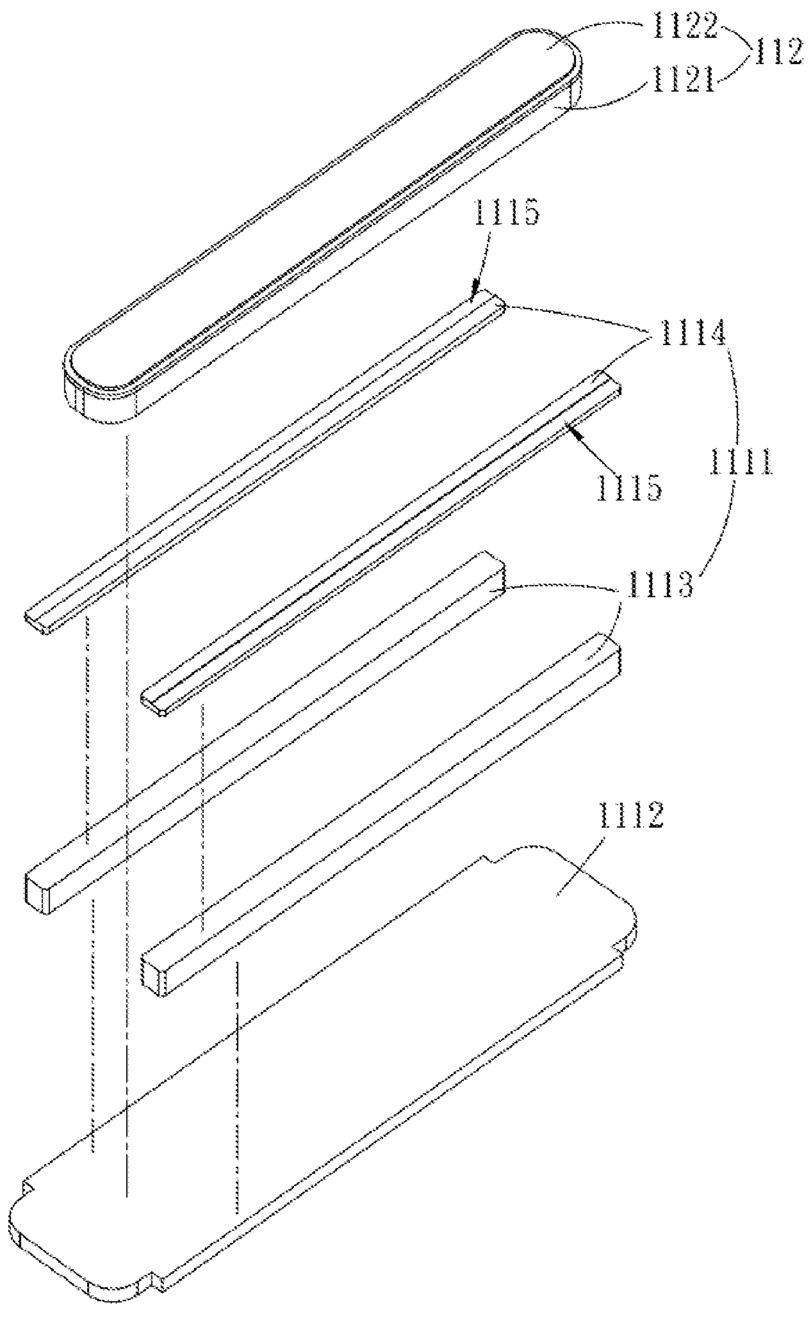
FIG. 5 illustrates a schematic exploded view of a magnetic element of a second embodiment of the double-sided speaker device of the present invention.
Figure 6:
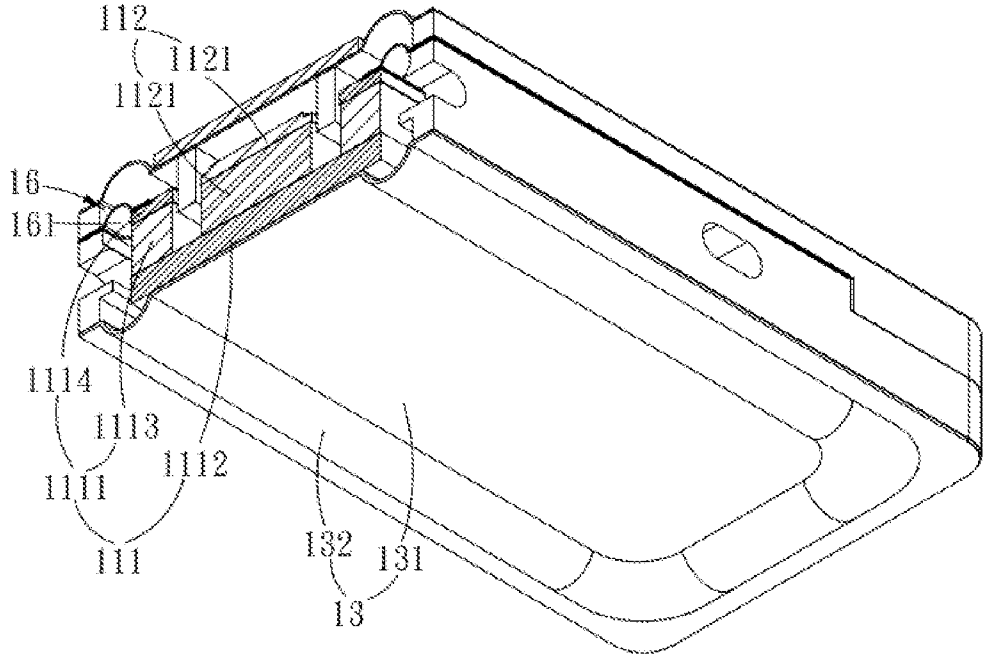
FIG. 6 illustrates a schematic 3-D view of a cross section of the second embodiment of the double-sided speaker device of the present invention.
Figure 7:
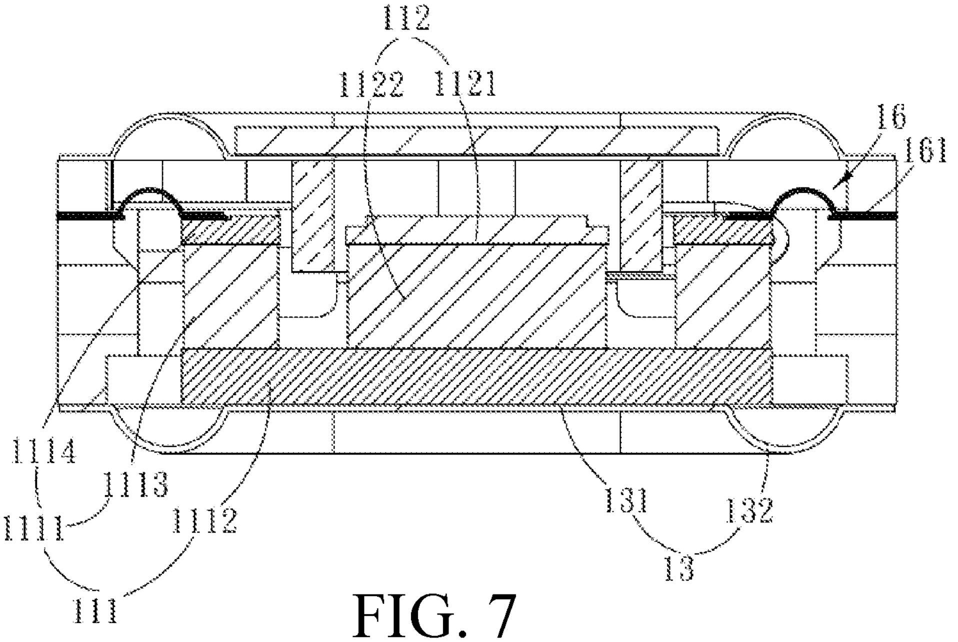
FIG. 7 illustrates a schematic view of a cross section of the second embodiment of the double-sided speaker device of the present invention.

Please refer to FIG. 5 to FIG. 7 simultaneously, which illustrate a schematic exploded view of the magnetic element of a second embodiment of the double-sided speaker device of the present invention, a schematic 3-D view of a cross section of the second embodiment of the double-sided speaker device of the present invention, and a schematic view of a cross section of the second embodiment of the double-sided speaker device of the present invention. According to the figures, the difference between the first embodiment and the present embodiment is the magnetic carrier 111. In the present embodiment, the two lateral walls 1111 of the magnetic carrier 111 further have two lateral magnetic members 1113 and two lateral magnetic plates 1114. The two lateral magnetic members 1113 are disposed at two sides of the bottom plate 1112, and the two lateral magnetic plates 1114 are disposed at the two lateral magnetic members 1113. The present invention is to dismantle the U-type structure, integrated by the bottom plate 1112, the two lateral magnetic members 1113 and the two lateral magnetic plates 1114 in the first embodiment, to several simple structures for convenient manufacturing. To the present embodiment, two heights of the two lateral walls 1111 are equal to or greater than a thickness of the magnetic circuit module 112, in order to is to provide a relatively stable operating magnetic field for the voice coil 15 moving in the stable magnetic field based on such structural setting. Further more, the two heights of the two lateral walls 1111 are greater than that of the magnetic member 1121.

Figure 8:
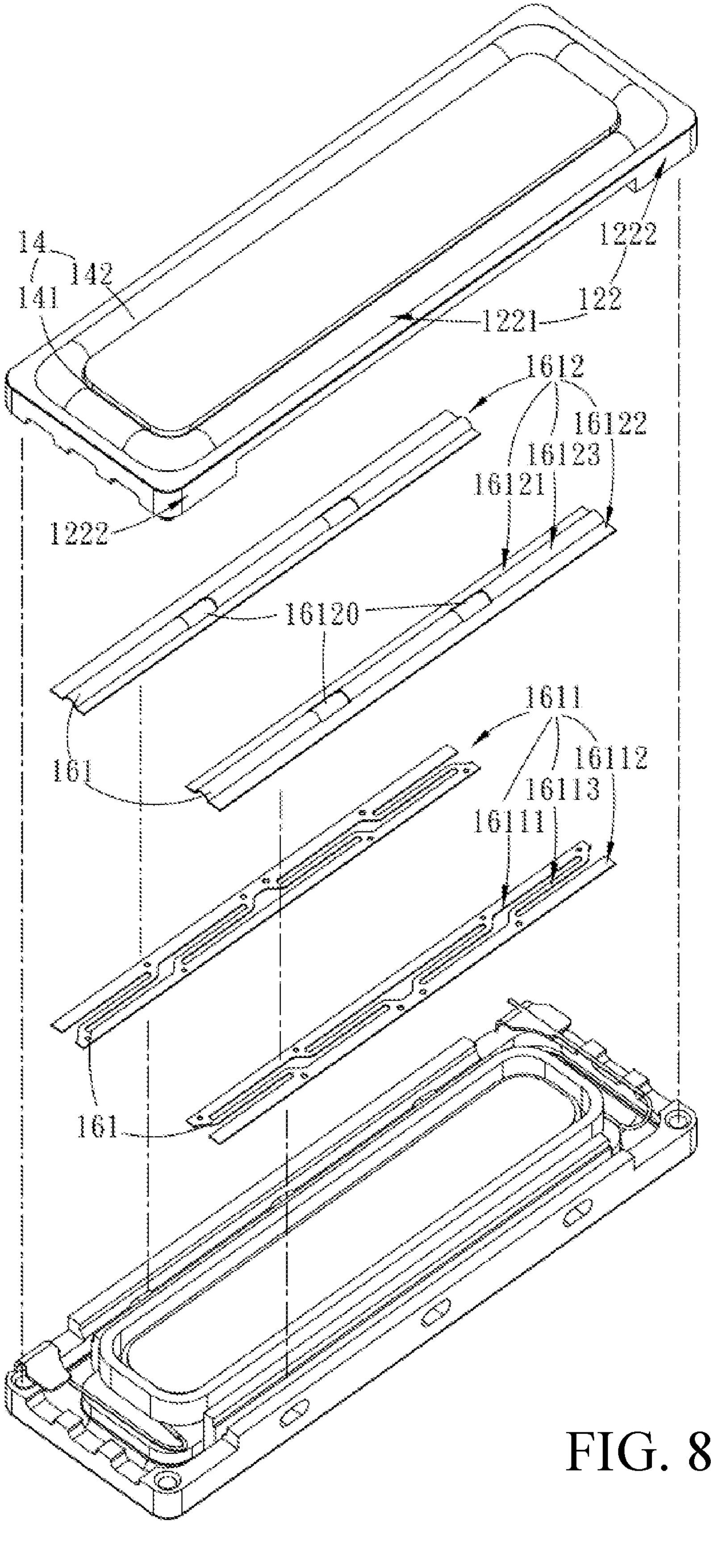
FIG. 8 illustrates a schematic exploded view of a third embodiment of the double-sided speaker device of the present invention.
Figure 9:
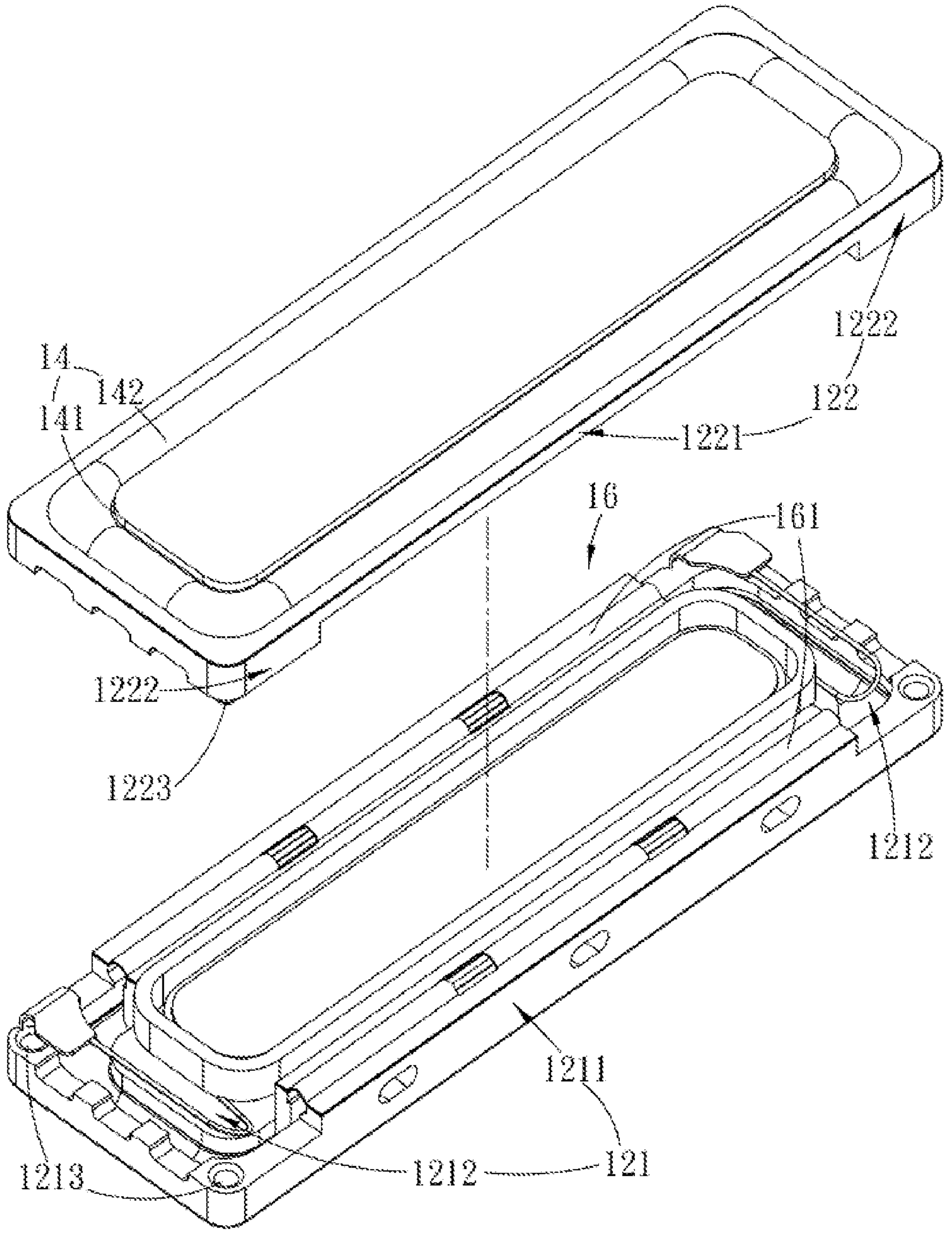
FIG. 9 illustrates another schematic exploded view of the third embodiment of the double-sided speaker device of the present invention.

Regarding to FIG. 8 and FIG. 9, which illustrate a schematic exploded view of a third embodiment of the double-sided speaker device of the present invention and another schematic exploded view of the present invention. As shown in figures, the differences between the present embodiment and the first embodiment are that of the two elastic members 161 further including two first elastic members 1611 and two second elastic members 1612. As to the third embodiment, the two first elastic members 1611 are connected with the two lateral walls 1111 of the magnetic carrier 111 and the outer frame 12. Each of the two first elastic members 1611 includes a first metal edge 16111, a second metal edge 16112 and a metal bracket 16113. Two ends of the metal bracket 16113 are connected with the first metal edge 16111 and the second metal edge 16112 respectively. The first metal edge 16111 is connected with and fixed on a top edge of one of the two lateral walls 1111, and the two metal edge 16112 is connected with and fixed on the outer frame 12. The metal bracket 16113 is parallel to the first metal edge 16111 and the second metal edge 16112. One end of the metal bracket 16113 is elongated laterally to connected with the first metal edge 16111, and the other end of the metal bracket 16113 is elongated laterally to connected with the second metal edge 16112. The present embodiment adopts the first elastic member 1611 with metal material to be beneficial for restricting the vibrations in the directions of non-up and down.

As mentioned above, the two second elastic members 1612 are disposed on the first elastic members 1611, and each of the two second elastic members 1612 is connected with the lateral wall 1111 of the magnetic carrier 111 and the outer frame 12. The second elastic member 1612 includes a first connection edge 16121, a second connection edge 16122 and a bending portion 16123, wherein the bending portion 16123 is bent to connect with the first connection edge 16121 and the second connection edge 16122, the first connection edge 16121 is connected with and fixed on the first metal edge 16111 of the first elastic member 1611, and the second connection edge 16122 is connected with and fixed on the second metal edge 16112 of the first elastic member 1611. Through the second elastic member 1612 with a soft plastic material to be an auxiliary role, it restricts the vibrations of the magnetic element 11 in the directions of non-up and down. Therefore, the assembly of the first elastic member 1611 and the second elastic member 1612 stables the connection of the magnetic carrier 111 and the outer frame 12.

Consequently, the bending portion 16123 can be plural on the second elastic member 1612. That is, every two adjacent bending portions 16123 is set an air hole 16120. The bending portion 16123 corresponds to the metal bracket 16113 in the direction of up and down, and the air hole 16120 of the bending portion 16123 corresponds to the metal bracket 16113 as well. Especially, the metal bracket 16113 faces the center of the vent hole 16120, so as to divide the air hole 16120 into two holes, right and left. In this way, a more even airflow distribution can be generated for the air inside the speaker device 1, so as to improve the average sound generation effect of the vibrating air inside the speaker device.

In this embodiment, in addition to the synergistic vibration effect of the first diaphragm 13 and the second diaphragm 14, together with the elastic element 16, the magnetic element 11 is thus formed as a movable member in the state of suspension, the magnetic element 11 vibrates by the same reaction force while in operation. In the mean time, the vibration forces of the magnetic element 11 are transmitted to the outer frame 12 via the elastic element 16. Such that, the problem that the resonance of the current speaker device affects the entire casing, resulting in poor effects on music playback, is solved.

In another embodiment, the two elastic members 1611, 1612 of the elastic elements 16 are connected with the magnetic carrier 111, but not the two ends of the later walls 1111 and the outer frame 12 (not shown in figures). In other words, the two elastic members 1611, 1612 are connected with the bottom plate 1112 and the outer frame 12, in order to let the magnetic element 11 be in the inner space of the double-sided speaker device 1 in the state of suspension. The double-sided speaker device 1 of the present invention may not restrict the arrangements of the two elastic members 1611, 1612 of the elastic element 16. Therefore, no matter the two elastic members 1611, 1612 are disposed at the two sides or ends of the magnetic carrier 111, the elastic members 1611, 1612 will absorb the vibration forces from the magnetic element 11. Further, the arrangements for disposing the two elastic members are demanded by customers/users.

Figure 10:
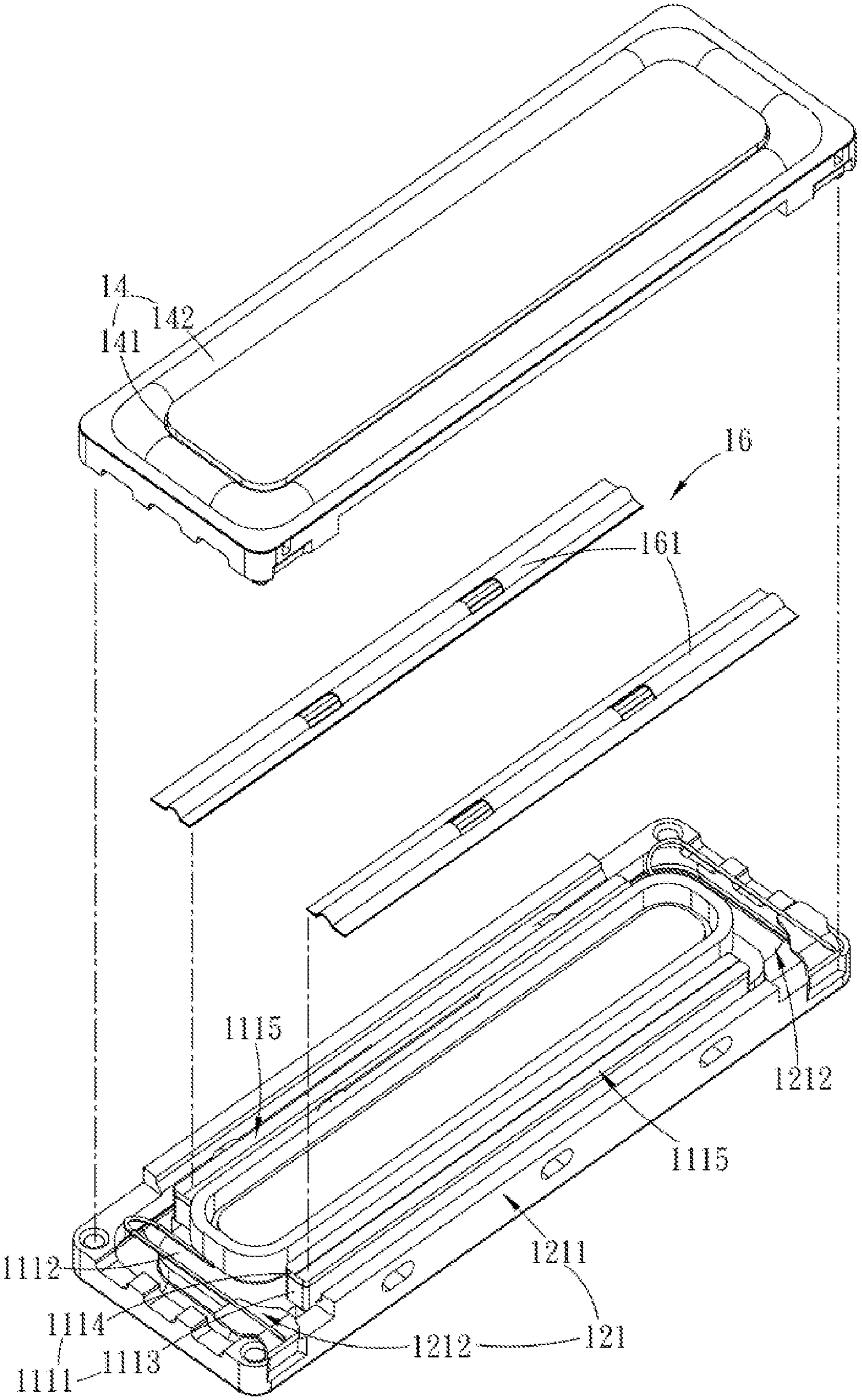
FIG. 10 illustrates a schematic exploded view of a fourth embodiment of the double-sided speaker device of the present invention.

With reference to FIG. 10, which illustrates a schematic exploded view of a fourth embodiment of the double-sided speaker device of the present invention. As shown in figure, the difference between the fourth embodiment and the third embodiment is the structure of the magnetic carrier 111. The magnetic carrier 111 applied in the present embodiment is the same as that of the second embodiment. The magnetic carrier in the embodiment is designed based on the elastic member 161 of the elastic element 16. Two outer sides of the two lateral magnetic plates 1114 of the magnetic carrier 111 have two magnetic notches 1115, and an inner side of the elastic member 161 of the elastic element 16 is fixed at the magnetic notch 1115, an outer side of the elastic member 161 of the elastic element 16 is fixed at the outer frame 12. The fourth embodiment enhances the arrangement for fixing the inner side of the elastic member 161 of the elastic element 16.

Figure 11:
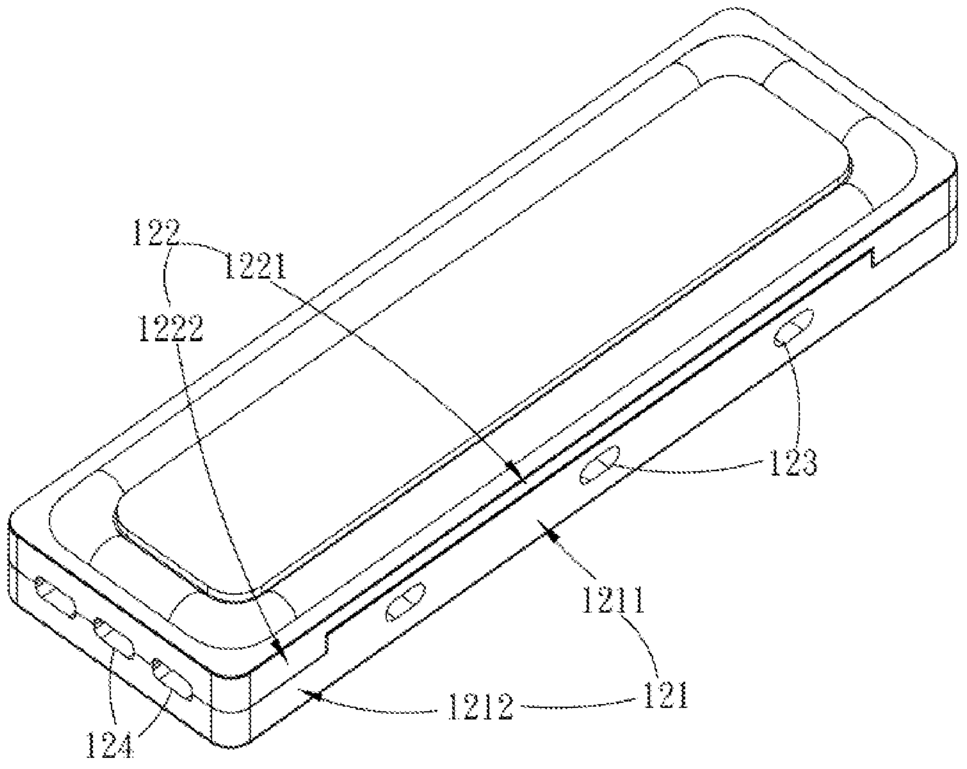
FIG. 11 illustrates a schematic 3-D view of a fifth embodiment of the double-sided speaker device of the present invention.

With reference to FIG. 11, which illustrates a schematic 3-D view of a fifth embodiment of the double-sided speaker device of the present invention. As shown in figure, the difference between the fifth embodiment and the first embodiment is the outer frame 12. Regarding the first embodiment, the outer frame 12 is a single frame, the outer side of the elastic element 16 is directly fixed on the inner wall of the outer frame 12. Please refer to FIG. 8 to FIG. 10 as well, the outer frame 12 of the present invention is assembled by two frames. The outer frame 12 further has two first frames 121 and two second frames 122, and the two outer sides of the elastic element 16 are fixed between the first frame 121 and the second frame 122. Each of the first frame 121 has a first frame portion 1211 and two first fixed portions 1212, and the two first fixed portions 1212 are located at two ends of the first frame portion 1211. Each of the second frame 122 has a second frame portion 1221 and two second fixed portions 1222, and the two second fixed portions 1222 are located at two ends of the second frame portion 1221. The second frame 122 is assembled on the first frame 121, and the second frame portion 1221 is correspondingly assembled with the first frame portion 1211. An outer side of the elastic member 161 of the elastic element 16 are fixed in between the first frame portion 1211 and the second frame portion 1221, and the two second fixed portions 1222 are correspondingly assembled with the first fixed portions 1212.

Accordingly, the first frame portion 1211 is protruded between the two first fixed portions 1212, and the second frame portion 1221 is recessed between the two second fixed portions 1222, wherein the first frame portion 1211 is embedded in the second frame portion 1221, and the two second fixed portions 1222 are assembled with the two first fixed portions 1212. The four heights of the two first fixed portions 1212 and the two second fixed portions 1222 are the same. In other words, two ends of the outer frame 12 are equally divided into two parts, which are the first fixed portion 1212, a lower part, and the second fixed portion 1222, an upper part. Further, the two first fixed portions 1212 have a plurality of fixed holes 1213, and the two second fixed portions 1222 have a plurality of fixed columns 1223, wherein the plurality of fixed columns 1223 of the two second fixed portions 1222 are embedded in the plurality of fixed holes 1213 of the two first fixed portions 1212. Hence, the outer frame 12 is composed of the first frame 121 and the second frame 122. In addition, the outer frame 12 further has a plurality of first air holes 123 and second air holes 124, wherein the first air holes 123 are disposed on a side surface of the first frame portion 1211 of the first frame 121, and the second air holes 124 are disposed between the two first fixed portions 1212 of the first frame 121 and the two second fixed portions 1222 of the second frame 122. Therefore, the second air holes 124 are composed of the two first fixed portions 1212 assembling with the two second fixed portions 1222 correspondingly.

Figure 12:
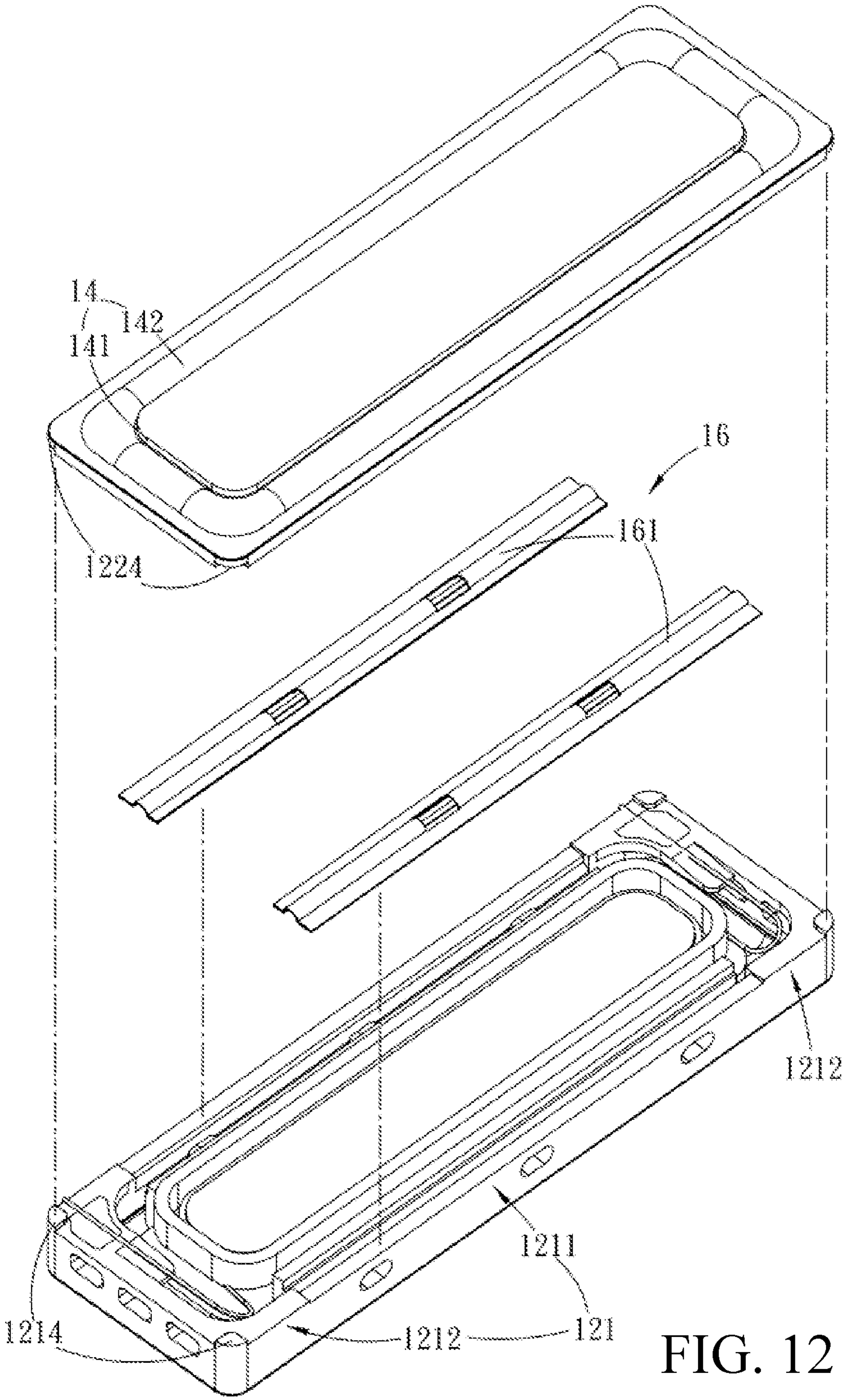
FIG. 12 illustrates a schematic exploded view of a sixth embodiment of the double-sided speaker device of the present invention and FIG. 13 illustrates a schematic 3-D view of an outer frame of the sixth embodiment of the double-sided speaker device of the present invention.
Figure 13:
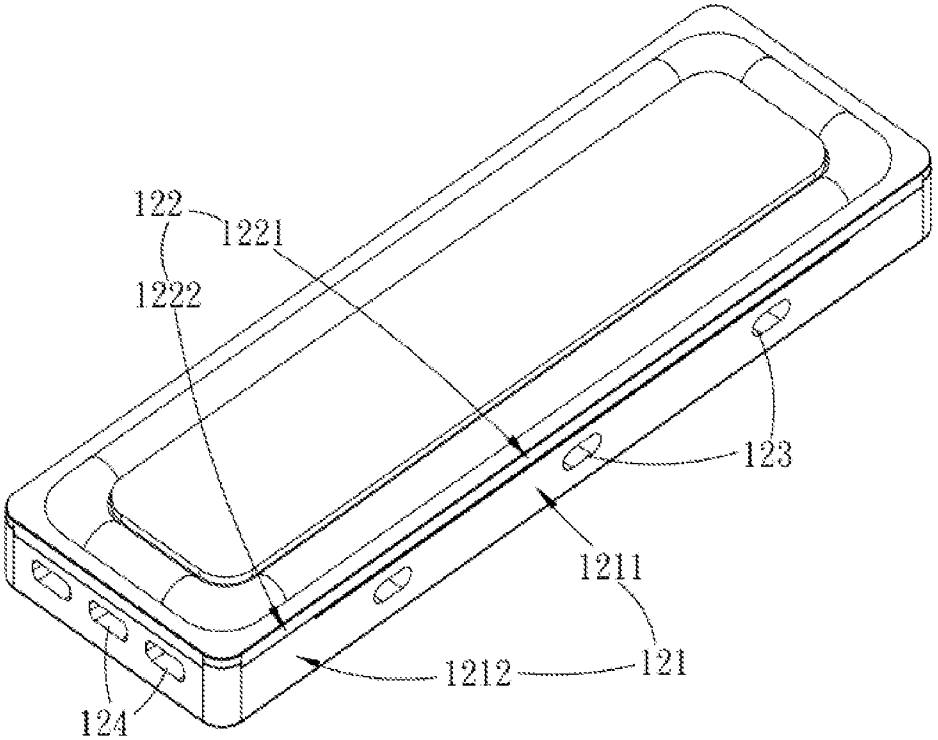

Regarding to FIG. 12 and FIG. 13, which illustrate a schematic exploded view of a sixth embodiment of the double-sided speaker device of the present invention and a schematic 3-D view of the outer frame of the double-sided speaker device of the present invention. As shown in figure, the difference between the sixth embodiment and the fifth embodiment is the structure of the outer frame 12 assembled with the outer sides of the elastic element 16. The first frame portion 1211 is recessed in the two first fixed portions 1212, and a height of the second frame portion 1221 is the same as two heights of the two first fixed portions 1212. The second frame portion 1221 is disposed on the first frame portion 1211, and the second frame portion covers a recess structure of the first frame portion 1211. The outer side of the elastic member 161 of the elastic element 16 is just accommodated by the recess structure of the first frame portion 1211. In this way, the second frame portion 1221 is able to fix the outer side of the elastic member 161 of the elastic element 16 on the first frame portion 1211. Each of the two first fixed portions 1212 has two side columns 1214 at two corners thereof, and each of the two second fixed portions 1222 has two side grooves 1224 at two corners corresponding to the two corners of the first fixed portion 1212. The side columns 1214 of the first fixed portion 1212 are embedded in the side grooves 1224 of the second fixed portion 1222. Therefore, the two side columns 1214 of the first frame 121 are able to effectively fix the second frame 122. Additionally, a height of the second frame 122 is less than that of the first frame 121, and the second frame 122 is a steel structure. After the second diaphragm 14 fixed at the second frame 122, the vibration conduction of sound is enhanced since the structural rigidity of the second frame 122 is great. The outer frame 12 further has a plurality of first air holes 123 and second air holes 124, wherein the first air holes 123 are disposed on a side surface of the first frame portion 1211 of the first frame 121, and the second air holes 124 are disposed on two end surfaces of the two first fixed portion 1212 of the first frame 121.

As a conclusion, the present invention provides a double-sided speaker device, the elastic elements of which are connected with the magnetic element and the outer frame. When the magnetic element performs electromagnetic induction to make the voice coil and the second diaphragm vibrate and produce sound, the magnetic element will vibrate under the same reaction force. At this time, the vibration force, and the vibration forces have been absorbed by the elastic element and the first diaphragm to greatly reduce the impact on the outer frame, thereby reducing the impact of the vibration of the outer frame to the entire body of the double-sided speaker device. Further, the vibration forces are also absorbed by the first diaphragm with a large surface area, so as to decrease the impact to the outer frame. Because the first diaphragm is passively connected and arranged under the outer frame, during operation, the first diaphragm can play a role of passive radiation and enhance the low-frequency effect during sound generation.

Although the present disclosure is disclosed in the foregoing embodiments, it is not intended to limit the present disclosure. Changes and modifications made without departing from the spirit and scope of the present disclosure belong to the scope of the claims of the present disclosure. The scope of protection of the present disclosure should be construed based on the following claims.

What is claimed is:

1. A double-sided speaker device, comprising:

a magnetic element, having a magnetic carrier and a magnetic circuit module, the magnetic carrier having two lateral walls and a bottom plate, the two lateral walls being disposed at two sides of the bottom plate, the magnetic circuit module being disposed on the bottom plate;

an outer frame, disposed at a peripheral side of the magnetic element;

a first diaphragm, disposed beneath the outer frame, an inner surface of the first diaphragm being adhered to a bottom surface of the bottom plate of the magnetic carrier;

a second diaphragm, disposed on the outer frame and located above the magnetic element;

two voice coils, disposed underneath the second diaphragm, wrapped around the magnetic element, and located between the magnetic circuit module and the two lateral walls of the magnetic carrier; and two elastic elements, connected with the magnetic carrier and the outer frame, and disposed at two sides of the magnetic carrier correspondingly.

2. The double-sided speaker device according to claim 1, wherein the bottom plate and the two lateral walls of the magnetic carrier are integrally formed as a U-type structure.

3. The double-sided speaker device according to claim 2, wherein two heights of the two lateral walls are equal to or greater than a thickness of the magnetic circuit module.

4. The double-sided speaker device according to claim 1, wherein the two lateral walls of the magnetic carrier further have two lateral magnetic members and two lateral magnetic plates, the two lateral magnetic members being disposed at two sides of the bottom plate, and the two lateral magnetic plates being disposed at the two lateral magnetic members.

5. The double-sided speaker device according to claim 4, wherein two outer sides of the two lateral magnetic plates have two magnetic notches, two inner sides of the elastic element being fixed at the two magnetic notches, two outer sides of the elastic element being fixed at the outer frame.

6. The double-sided speaker device according to claim 1, wherein the magnetic circuit module further has a magnetic member and a magnetic plate, the magnetic member being disposed at the bottom plate, the magnetic plate being disposed on the magnetic member.

7. The double-sided speaker device according to claim 1, wherein the outer frame further has two first frames and two second frames, two outer sides of the elastic element being fixed between the first frame and the second frame.

8. The doubled-sided speaker device according to claim 7, wherein each of the first frame has a first frame portion and two first fixed portions, the two first fixed portions being located at two ends of the first frame portion, each of the second frame has a second frame portion and two second fixed portions, the two second fixed portions being located at two ends of the second frame portion, the second frame being assembled on the first frame, the second frame portion being correspondingly assembled with the first frame portion, an outer side of the elastic element being fixed in between the first frame portion and the second frame portion, the two second fixed portions being correspondingly assembled with the first fixed portion.

9. The double-sided speaker device according to claim 8, wherein the first frame portion is protruded between the two first fixed portions, and the second frame portion is recessed between the two second fixed portions, the first frame portion being embedded in the second frame portion, the two second fixed portions being assembled with the two first fixed portions.

10. The double-sided speaker device according to claim 9, wherein four heights of the two first fixed portions and the two second fixed portions are the same.

11. The double-sided speaker device according to claim 9, wherein the two first fixed portions have a plurality of fixed holes, and the two second fixed portions have a plurality of fixed columns, the plurality of fixed columns of the two second fixed portions being embedded in the plurality of fixed holes of the two first fixed portions.

12. The double-sided speaker device according to claim 9, wherein the outer frame (12) further has a plurality of first air holes and second air holes, the first air holes being disposed on a side surface of the first frame portion of the first frame, the second air holes being disposed between the two first fixed portions of the first frame and the two second fixed portions of the second frame, the second air holes being composed of the two first fixed portions assembling with the two second fixed portions correspondingly.

13. The double-sided speaker device according to claim 8, wherein the first frame portion is recessed in the two first fixed portions, a height of the second frame portion being the same as two heights of the two first fixed portions, the second frame being disposed on the first frame, the second frame portion covering a recess structure of the first frame portion.

14. The double-sided speaker device according to claim 13, wherein each of the two first fixed portions has two side columns at two corners thereof, and each of the two second fixed portions has two side grooves at two corners corresponding to the two corners of the first fixed portion, the side columns of the first fixed portion being embedded in the side grooves of the second fixed portion.

15. The double-sided speaker device according to claim 13, wherein the second frame is a steel structure.

16. The double-sided speaker device according to claim 13, wherein the outer frame further has a plurality of first air holes and second air holes, the first air holes being disposed on a side surface of the first frame portion of the first frame, the second air holes being disposed on two end surfaces of the two first fixed portions of the first frame.

* * * * *